G. F. HAUSMANN.
PROCESS OF PREPARING CORNCOBS IN THE MANUFACTURE OF PIPES.
APPLICATION FILED JAN. 2, 1908.
909,087.
Patented Jan. 5, 1909.
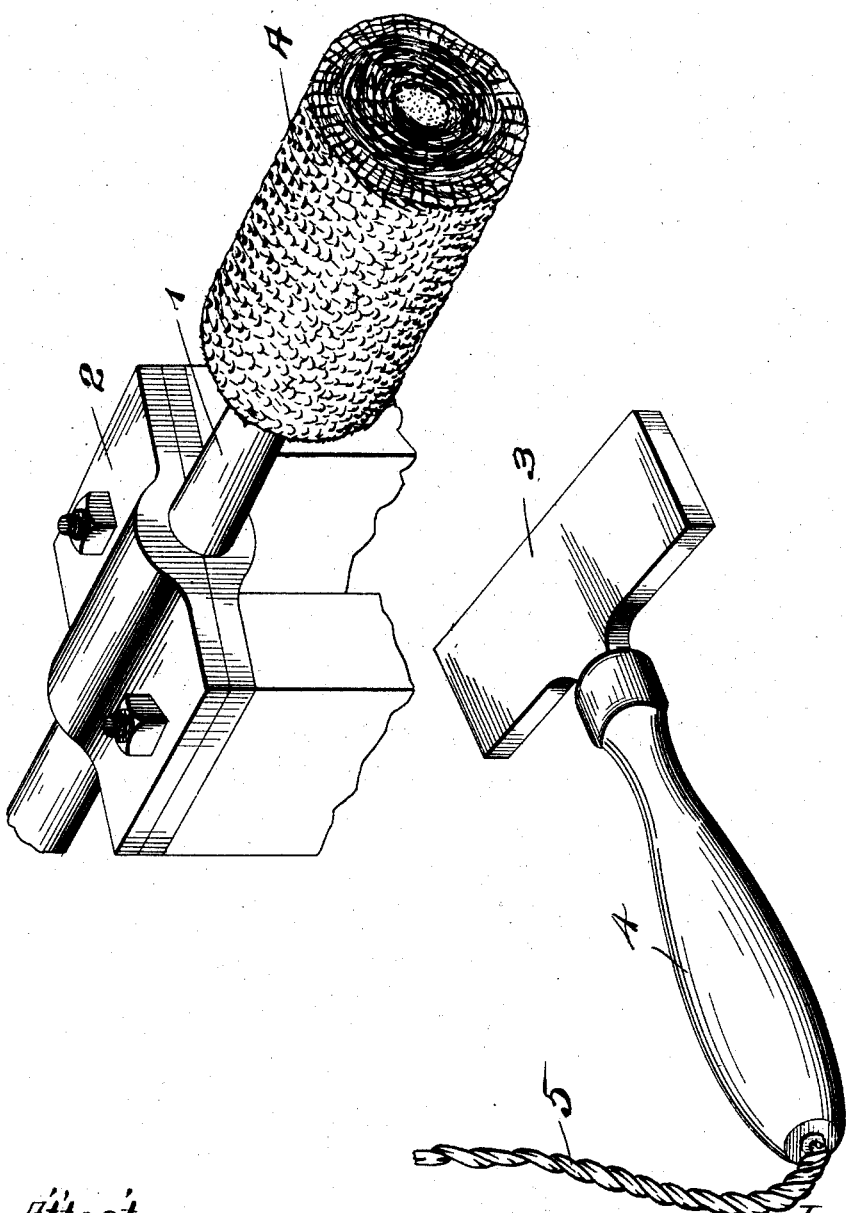
Attest
E. W. Harrington
W. C. Smith
Inventor:
G. F. Hausmann.
By Higdon & Longan
Attys.

UNITED STATES PATENT OFFICE.

GEORGE F. HAUSMANN, OF WASHINGTON, MISSOURI.

PROCESS OF PREPARING CORNCOBS IN THE MANUFACTURE OF PIPES.

No. 909,087.　　　　　Specification of Letters Patent.　　　　　Patented Jan. 5, 1909.

Application filed January 2, 1908.　Serial No. 408,932.

*To all whom it may concern:*

Be it known that I, GEORGE F. HAUSMANN, a citizen of the United States, and a resident of Washington, Franklin county, Missouri, have invented certain new and useful Improvements in Processes of Preparing Corncobs in the Manufacture of Pipes, of which the following is a specification containing a full, clear, and exact description, reference being had to the accompanying drawings, forming a part hereof.

My invention relates to a process of preparing corn cobs used in the manufacture of tobacco pipes, and the object of my invention is to char the exterior surface of the corn cob in order that the subsequent cutting or turning operation to which the cob is subjected may be easily and quickly accomplished, thus expediting and cheapening the manufacture of the pipes.

The drawing is a perspective view of one form of means which may be employed in carrying out my improved process.

Referring by numerals to the accompanying drawing, 1 designates a mandrel, which is arranged for rotation in a suitable bearing 2, and which mandrel receives the corn cob A or section thereof which is to be formed into a tobacco pipe bowl.

3 designates a metal plate, provided with a handle 4, and which plate is adapted to be heated by means of an electric current passing through conductors 5.

In carrying out the process with this form of apparatus, the cob, or section thereof, is placed on the mandrel, and said mandrel is rotated in any suitable manner. A current of electricity passing through the conductors 5 heats the plate 3 to a red or white heat, and said plate is applied directly to the periphery of the rotating cob; and, as a result, the entire surface of said cob is quickly charred.

While I have illustrated but a single means of charring the surfaces of the cobs, it will be readily understood that the operation can be accomplished in a variety of ways; for instance, by the use of a flame or bed of coals, over which the cob is rotated, by rolling the cobs over a heated plate, or by passing said cobs lengthwise through a heated tube.

If desired, the cobs may be immersed for a certain period of time in a chemical solution, which will decompose the surfaces of the cobs to a uniform depth, thus accomplishing the same object as where heat is utilized for charring the surfaces of the cobs.

After the surfaces of the cobs have been properly charred, they are delivered to the lathe or forming machine, which very easily and rapidly removes the charred surfaces, and turns the cobs or sections into pipe bowls, which are now ready to be finished.

I claim:—

The process of preparing a corn cob for cutting or turning consisting in charring by a heated tool the natural rough surface of a corn cob throughout the periphery of the prepared cob to an even radial distance from the center.

In testimony whereof, I have signed my name to this specification, in presence of two subscribing witnesses.

GEORGE F. HAUSMANN.

Witnesses:
　WALTER A. NEUSITZ,
　MARTIN P. SMITH.